Figure 1:
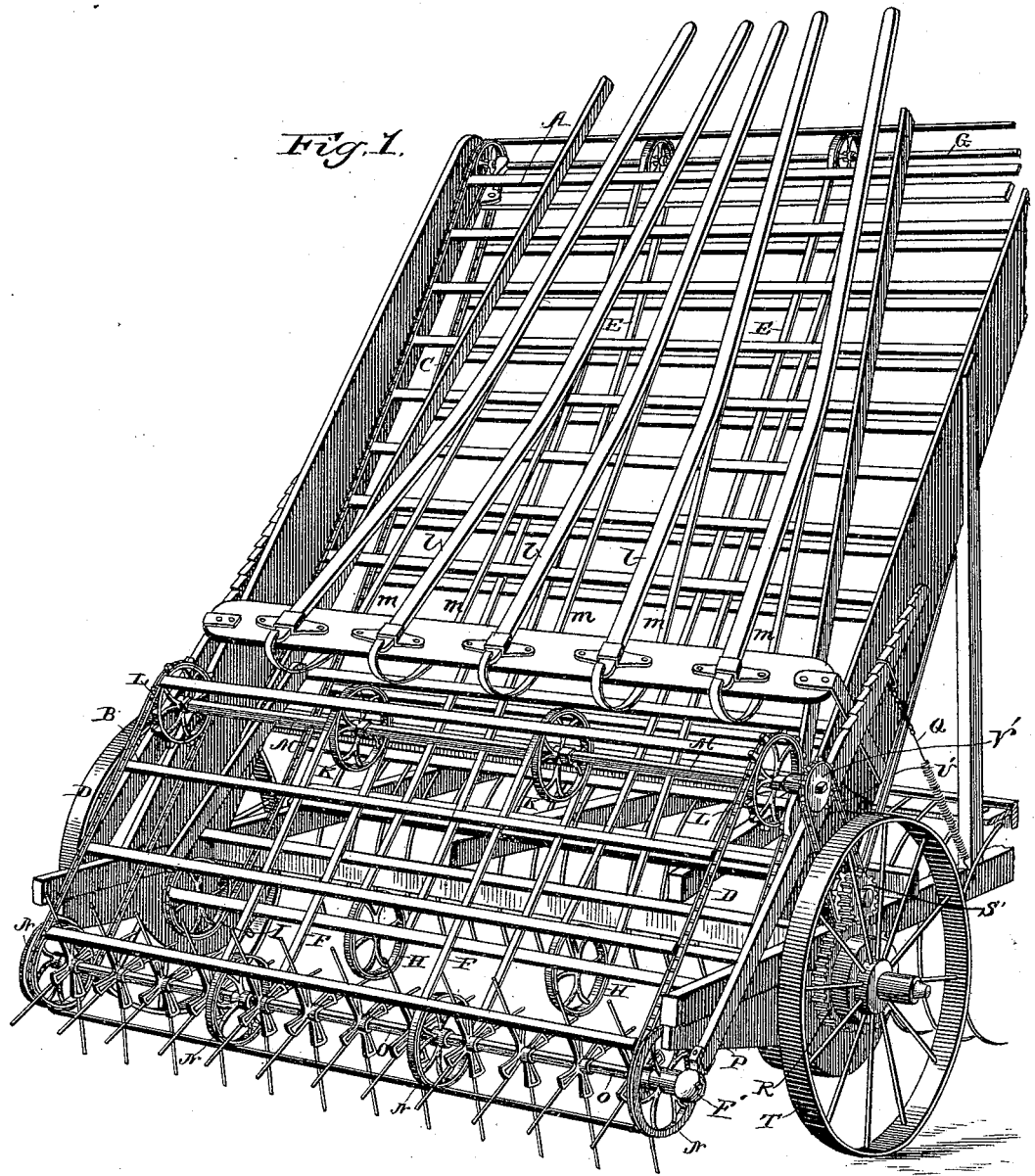

(No Model.)

5 Sheets—Sheet 1.

M. BECK.
HAY LOADER.

No. 448,006.

Patented Mar. 10, 1891.

Witnesses.
Wm. M. Rheem
E. C. Wiedeman

Inventor.
Marshall Beck
By Elliott & Omohundro
Atty's.

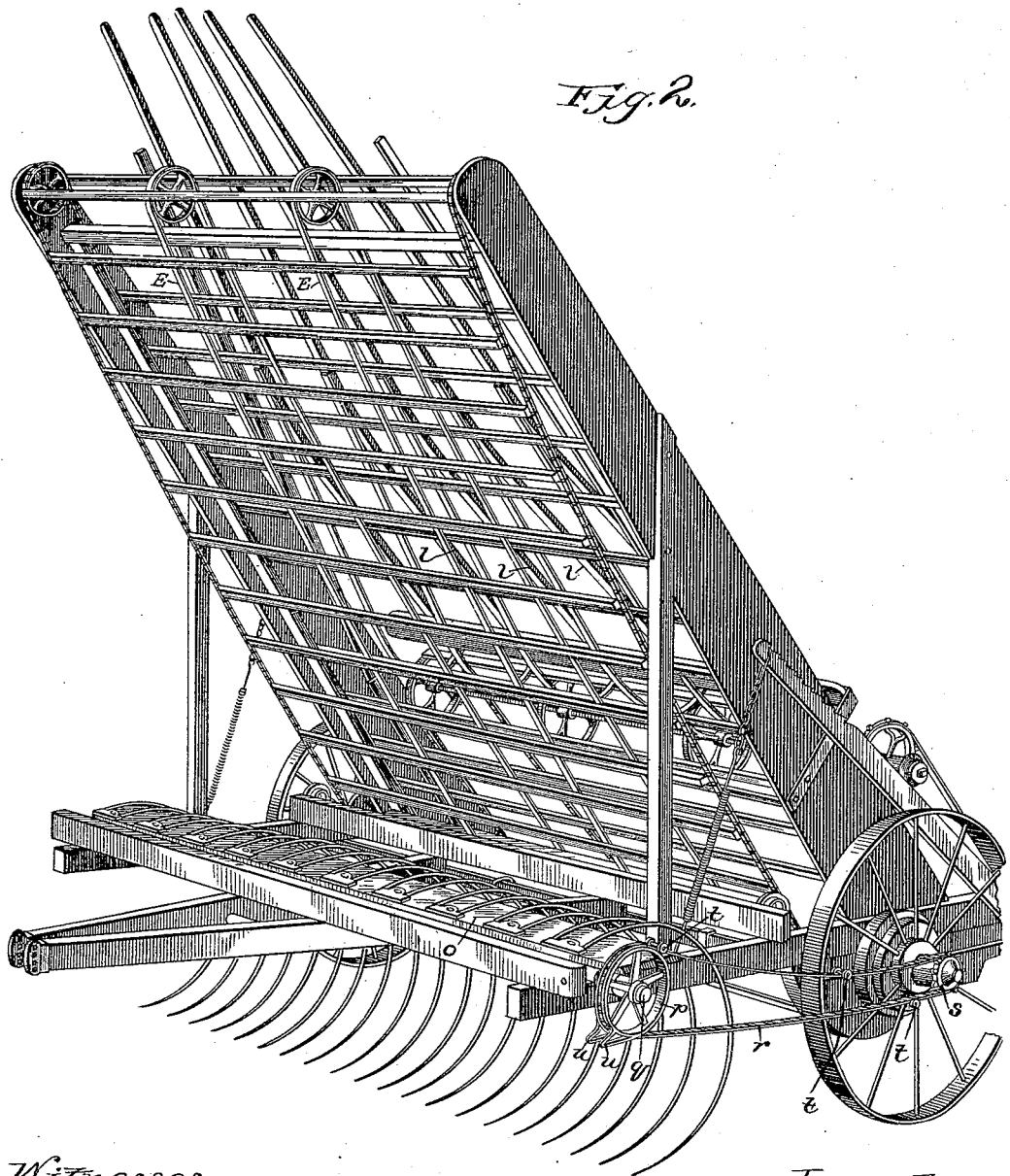

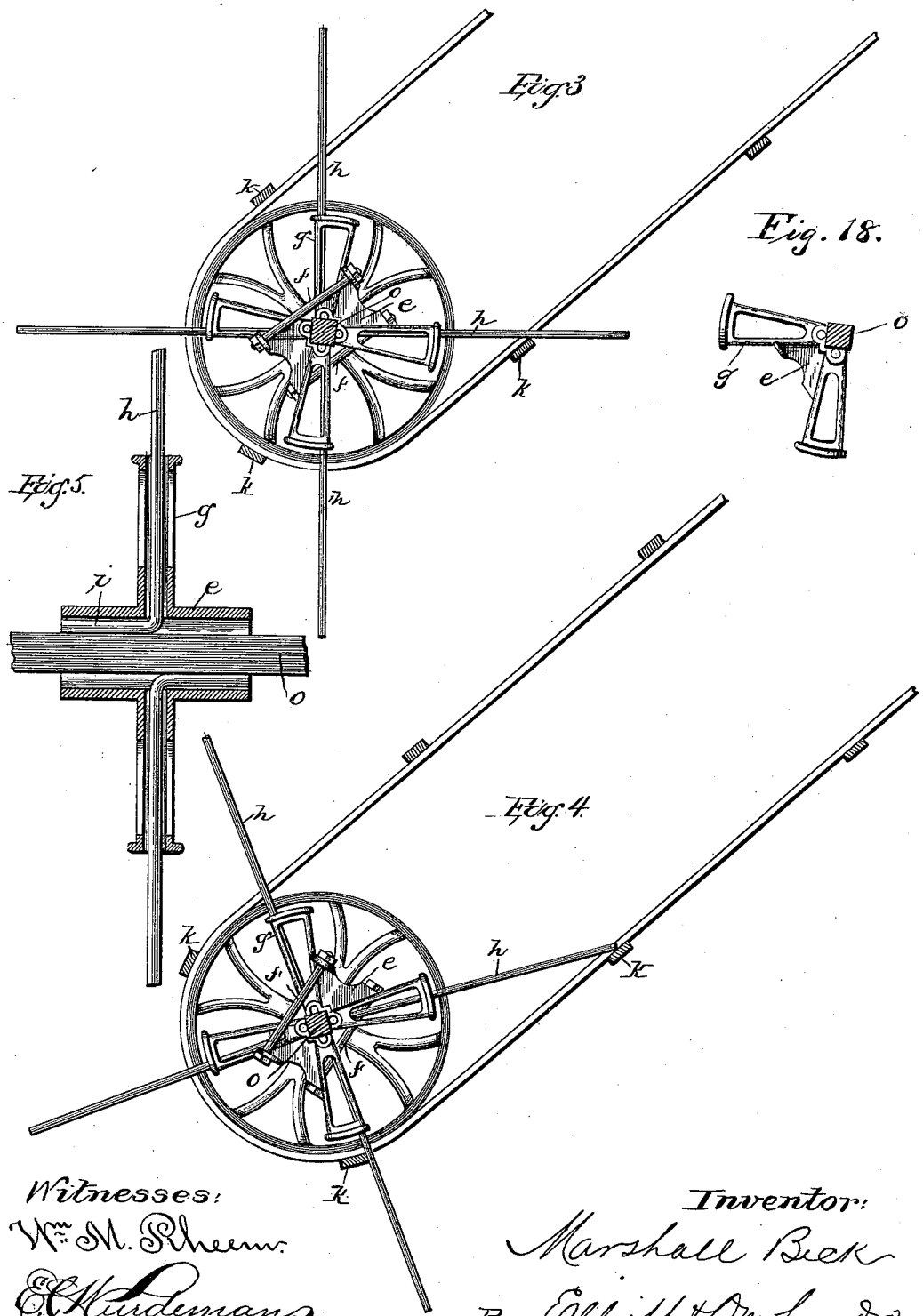

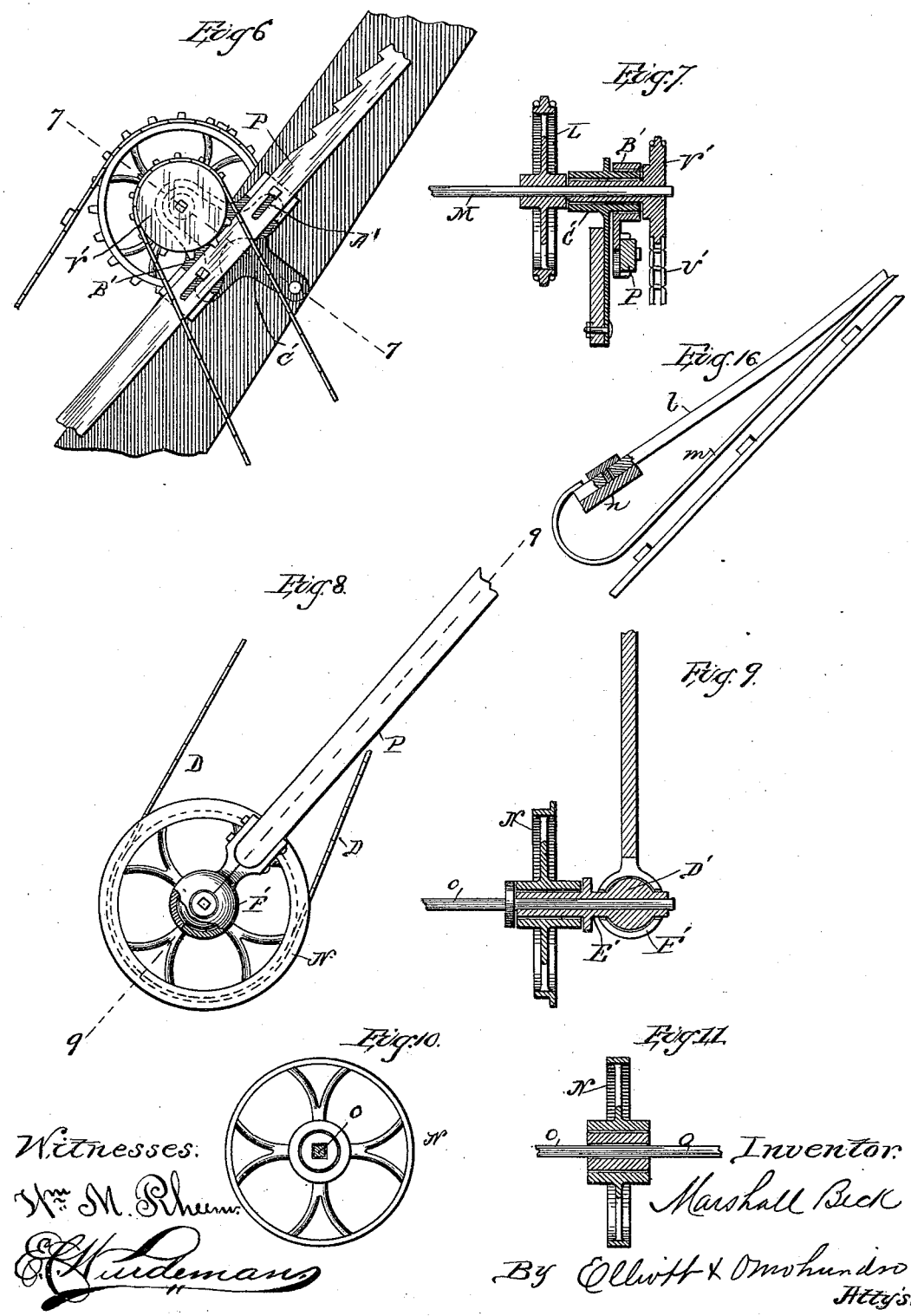

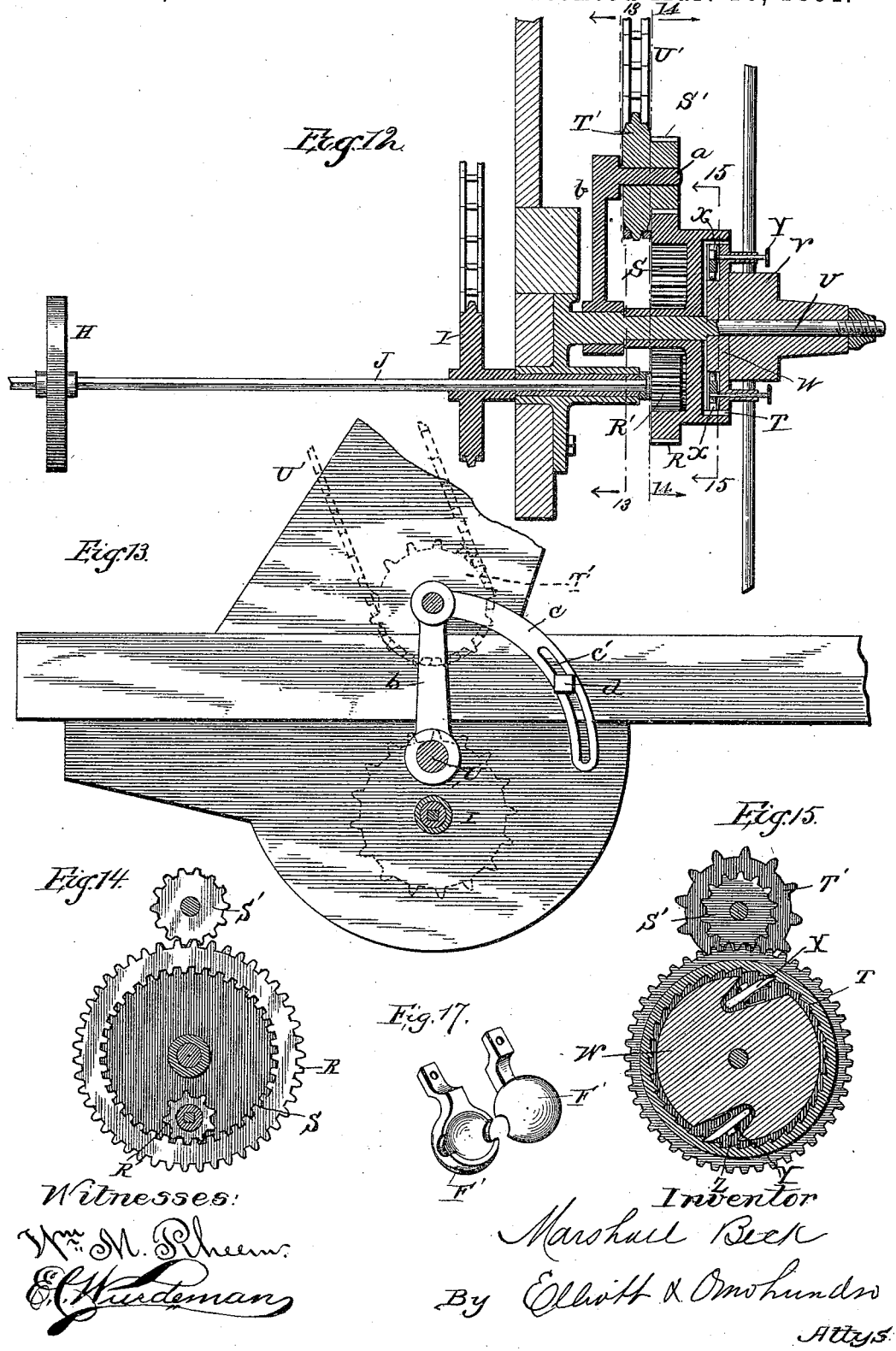

UNITED STATES PATENT OFFICE.

MARSHALL BECK, OF CHICAGO, ILLINOIS, ASSIGNOR TO THE BECK & HOPKINS MANUFACTURING COMPANY, OF SAME PLACE.

HAY-LOADER.

SPECIFICATION forming part of Letters Patent No. 448,006, dated March 10, 1891.

Application filed March 25, 1890. Serial No. 345,259. (No model.)

*To all whom it may concern:*

Be it known that I, MARSHALL BECK, a citizen of the United States, and a resident of Chicago, in the county of Cook and State of Illinois, have invented certain new and useful Improvements in Hay-Loaders, of which the following is a specification.

This invention relates to improvements in that class of hay-loaders in which the elevating apron or carrier is preceded by a dumping-rake, forming part of the machine, and assisted in the initial elevation of the hay from the ground by a following or delivery rake and a short auxiliary carrier or packing-apron, between which and the main carrier the hay is compressed at the beginning of its elevation; but it is more especially designed as an improvement upon the invention set forth in United States Letters Patent No. 361,118, granted me on the 12th day of April, A. D. 1887.

The prime object of this invention is to have a gathering auxiliary carrier subserving the double purpose of the delivery-rake and packing-apron of the prior machines, whereby through the action of the carrier the hay will be gathered and delivered to the elevating-carrier by a continuous operation.

Another object is to combine with the auxiliary carrier a rake or gathering mechanism wholly dependent for its operation upon the carrier, whereby the rake will only gather the hay as rapidly as it is stripped therefrom by the auxiliary carrier.

A further object is to have the gathering auxiliary carrier adjustable relative to the ground and yieldingly supported in any adjusted position, so that it will float or rise from the ground when met by an obstruction without interfering with the continuous operation of the machine, and, further, to have the lower ends of the sides of the carrier adjustable and yielding independent of each other.

A further object is to provide novel and effective means for automatically dumping the lead rake at regular intervals, utilizing the power of the draft for this purpose.

A still further object is to provide a novel and effective driving mechanism for transmitting the power of the ground or drive wheel to the main or elevating carrier and the gathering auxiliary carrier and for imparting thereto the proper relative speed, and, finally, to provide certain novel details of construction in the carrying out of my invention for attaining these important objects, all as illustrated in the accompanying drawings, in which—

Figure 1 represents a rear perspective view of a hay-loader embodying my invention; Fig. 2, a similar view taken from the front of the machine; Fig. 3, an enlarged detail section through the rotary delivery-rake of the gathering auxiliary carrier; Fig. 4, a similar view of the same parts in a different position; Fig. 5, a central vertical section thereof; Fig. 6, a detail side elevation of the supporting-bars and driving-shaft and mechanism at the upper end of the gathering auxiliary carrier; Fig. 7, a transverse section on the line 7 7 of Fig. 6; Fig. 8, a detail side elevation of the lower end of the auxiliary carrier; Fig. 9, a section thereof on the line 9 9 of Fig. 8;
Fig. 10, a detail sectional elevation more clearly showing the manner of journaling the idle-pulleys; Fig. 11, a central vertical section thereof; Fig. 12, an enlarged detail section through the driving-gear connecting the ground-wheel with the carriers; Fig. 13, a vertical section on the line 13 13 of Fig. 12, looking in the direction indicated by the arrows; Fig. 14, a vertical section on the line 14 14 of Fig. 12, looking in the direction indicated by the arrows; Fig. 15, a similar view taken on the line 15 15 of Fig. 12, looking in the direction indicated by the arrows; Fig. 16, a detail side elevation of one of the retaining-slats, the spring-compressor, and carrier, with the carrier in longitudinal section; Fig. 17, a detail perspective view of the socket-pieces of the auxiliary carrier; Fig. 18, a detailed view of one of the socket-pieces for holding the rake-teeth.

Similar letters of reference indicate the same parts in the several figures of the drawings.

Referring by letter to the accompanying drawings, A indicates the main elevating-carrier, and B a short auxiliary carrier opposing the lower end thereof and working substantially parallel therewith, both of which carriers are preferably composed of slats attached at their ends, respectively, to drive-chains C D and at points intermediate their ends to belts E F, which latter serve to strengthen the slats and better adapt them for their intended uses. The chains and belts of the elevating-carrier work over suitable idlers upon a cross-shaft G, journaled in the frame of the machine at the upper end thereof, and at the lower end the belts and chains of the carrier work over and are driven by pulleys H and sprocket-wheels I, mounted upon a cross-shaft J, (see Fig. 12,) journaled in the frame of the machine and driven in the manner described farther on. The belts and chains of the auxiliary carrier work over and are driven by pulleys K and sprocket-wheels L, mounted upon a cross-shaft M, journaled upon the frame of the machine above the elevating-carrier and at their lower ends over idlers N, mounted upon a cross-shaft O, journaled at its ends upon swinging or hanging bars P, journaled and pivotally supported upon the bearing of the shaft M, as more clearly illustrated in Figs. 6 and 7, so as to swing upon the axis of this shaft and independent of the rotation thereof. These hanging bars have a slot-and-bolt connection A' with a hanging bracket B', which journals upon the bearing C' of the shaft M, thus furnishing a means of adjusting the relative distance between the shafts M and O for taking up the slack in the chains and belts of the auxiliary carrier. The upper ends of these bars, one of which is located at each side of the machine, are notched and engaged by a spring-rod Q, which serves to counterbalance the weight of the auxiliary carrier, and the mechanism attached to the shaft O being adjustably connected with the bars by means of the notches therein, so that the position of the lower end of the auxiliary carrier may be adjusted relative to the ground, but at all times be yieldingly supported, so that it may rise over obstructions or give way in the event of the choking of the throat of the machine and immediately return by gravity to its normal adjusted position and be held there, under the influence of the spring-rod, after passing over the obstruction. It is also desirable that the lower ends of the sides of the auxiliary carrier be capable of yielding vertically independent of each other, to which end I prefer to provide a ball-and-socket connection between the shaft O and the hanging bars P, the ball D' being cast upon a sleeve E', mounted upon the shaft O, which sleeve is used because of the squared shaft, and also forms the bearings for the end idler N, about which works the chain D of the carrier.

The socket F' of the coupling is formed in two parts and bolted to the end of the bar P, encompassing the ball, thus allowing perfect freedom in the rotation of the shaft O, and at the same time permitting a vertical movement of either end of the shaft independent of the other.

The drive-shafts J and M of the elevating and auxiliary carriers, respectively, are preferably driven by the mechanism more clearly shown in Figs. 1, 6, 7, and 12 to 15, inclusive, consisting of a double cog-wheel comprising an external cog R, an internal cog S in one face thereof, and an internal ratchet T in the opposite or outer face thereof, the wheel as a whole being journaled upon a stud-axle U, rigidly secured to and projecting from the frame of the machine in any convenient manner. This stud-axle is preferably formed in three sections integral with each other, but differing slightly in diameter, the double cog-wheel being mounted upon the middle section and the hub V of the ground-wheel being mounted upon the outer section and having attached thereto a disk-plate or spider-frame W, carrying a spring-actuated pawl X and fitting within the internal ratchet, so that the pawls, under the influence of their springs, will normally project beyond the plate and engage the teeth of the ratchet, thus transmitting the rotation of the ground-wheel hub to the double or master cog-wheel. For convenience in throwing the ground-wheel out of gear, so as to work idle upon the axle while the machine is traveling from field to field, I provide pins Y, bearing in the plate W, and each terminating at its inner end in a cam projection Z and at its outer end in a thumb-piece, for convenience in actuating the pin, so that when rotated the cam projection on the inner end thereof will force the pawl down out of engagement with the ratchet and hold the same against the force of its actuating-spring.

The internal cog S of the master-cog meshes with a pinion R', mounted upon the drive-shaft J of the elevating-carrier, so as to drive the latter, while the rim or external cog R of the master cog-wheel meshes with a pinion S', cast with or otherwise rigidly secured to a sprocket-wheel T', over which works a sprocket-chain U', also working over a sprocket-wheel V', mounted upon the outer end of the upper or drive shaft M of the auxiliary carrier, and thus both the elevating and auxiliary carrier are simultaneously driven from the same ground-wheel and with proper relative speed, which is determined by the proportions of the several gear connections.

The pinion S' and sprocket-wheel T' are loosely mounted upon a stud $a$, rigidly secured to a radial arm $b$, loosely journaled upon the inner section of the axle U, which arm is provided with a slotted segment $c$, (see Fig. 13,) formed upon the arc of a circle struck from the axis of the axle and provided with a curved slot $c'$, through which works a set-bolt $d$ for locking the arm in any adjusted position. With this construction the position of the sprocket-wheel T' relative to the sprocket-wheel V' upon the shaft M may be quickly adjusted, so as to take up whatever slack occurs in the sprocket-chain U'. Obviously all of this driving mechanism for transmitting the rotation of the ground-wheels to the elevating and auxiliary carriers may be duplicated at the opposite side of the machine or employed upon one side thereof only.

In gathering auxiliary carriers as heretofore constructed the gathering or rake teeth have been attached directly to the slats of the carrier, traveling therewith; but I prefer that the rake, while connected and moving with and operated by the carrier, should be rotary in character and practically as separate therefrom as the ordinary following or delivery rake, thereby permitting the carrier to extend any desirable distance for more effectively assisting the main or elevating carrier in the initial elevation of the hay and without being encumbered by teeth, which tend to engage and draw the hay away from the elevating-carrier on the return side when leaving the elevating-carrier. To this end I provide a series of socket-pieces $e$, rigidly secured by bolts $f$ or otherwise to the lower shaft $O$ of the auxiliary carrier, which pieces are provided with a series of radial hollow or slotted arms $g$, in the slots of which work the rake-teeth $h$, as more clearly illustrated in Figs. 3, 4, and 5. These rake-teeth terminate at their inner ends in right-angular portions $i$, pivoted in suitable sockets in the bearings of the plate $e$, the teeth proper projecting through the slots in the arms $g$ considerably beyond the arms, whereby said teeth have relative to the arms, but limited by the stop action of the end walls of the arm-slots, a partial circumferential movement, and consequently are permitted to make a slight change in their radial position with relation to the axis of the shaft $O$. A number of these socket-pieces are employed and arranged with their corresponding radial arms in alignment with each other to provide for several rows or longitudinal series of radial teeth, each row of which extends lengthwise of the shaft and parallel with the slats. With the rows of teeth thus arranged with relation to the slats $k$ each slat will engage the rear side of the teeth of a row; but only one row at a time is in such engagement—that is to say, as illustrated in Fig. 3, only that row of teeth in operative position to rake the hay is engaged and moved by a slat to the end of the slot of the arm $g$, and as a result this row alone is doing the work of rotating the reel, and, furthermore, completes said work before the next row begins its turn of rotating the reel, it being understood that the shaft $O$ is free to turn, but does not rotate under the action of the carrier belts and chains, but is only actuated to turn by the teeth of the rake as the successive row is brought into operation. As the engaging slat continues its forward movement the row of teeth thereby engaged gradually rises, rotating the rake, and as the slat moves off at a tangent to the movement of the teeth it will slide along toward the end of the teeth, stripping from them the hay engaged thereby and forcing or packing it onto the lower end of the elevating-carrier; but when the forward edge of the slat has passed beyond the end of the teeth, as illustrated in Fig. 4, the teeth will remain at a standstill until the arms to which they are secured are moved by the next slat and teeth sufficiently to cause the opposite end wall of the slats therein to strike the teeth, by which time the first-described slat has passed sufficiently beyond the end of the teeth to entirely strip the hay therefrom. This operation will of course be repeated by each slat and series of teeth, which slats in turn become the drivers or actuators of the rake, it being understood that the slats are so spaced with reference to the teeth that as soon as the working-teeth cease their work the next series begin their work, thus producing a practically continuous operation of gathering and delivering the hay to the elevating-carrier, for the teeth of each series complete their share of gathering at the instant the next series of teeth are engaged by their corresponding driving-slat and begin to gather. This construction produces what may be termed a "gathering auxiliary carrier," for the gathering operation is dependent wholly upon the carrier, and the rake revolving about the axis of the lower end of the auxiliary carrier remains in fixed relation thereto at all times, rising or floating with the carrier in the manner before described.

The partial circumferential or vibrating movement of the rake-teeth in the slotted arms of their supports is an important feature of my invention, because if the teeth of a row were rigidly aligned and the slat out of parallelism therewith the working force of the slat would be substantially centered against an end tooth, leaving all of the other teeth to alone and by their individual resistance oppose the resistance of the hay, which their necessary flexibility would not successfully permit, whereas with a pivotal and partial circumferential movement, such as shown and described, every tooth is permitted to lag and will not oppose the resistance of the hay until engaged by the slat, the result being that no tooth can work at the expense of any other tooth, and that the hay is uniformly lifted by every tooth of a row, and the force of the slat as uniformly distributed to every tooth of that row. Furthermore, immediately the teeth or any of the teeth have performed their function of rotating the reel they will rest on the slat until the slat has traversed the entire length of the tooth, thereby stripping it of all its hay, whereas if the teeth were rigid the momentum of the reel would cause the teeth to move away from the slat before being completely stripped of hay, afterward clogging the machine.

After the hay leaves the upper end of the auxiliary carrier it must be made to pass under retaining-slats or equivalent devices, as otherwise it would roll back or blow back upon the returning side of the auxiliary carrier and be carried to the ground behind the machine. The practical difficulty is found in getting the hay safely past the opening, which must occur between the top end of the auxiliary carrier and the lower end of the retaining-slats $l$, the only positive means for doing this being to hold the hay against the surface of the main carrier, so that its motion will positively pull the hay under the retaining-slats and loose from the slats of the auxiliary carrier, to which it sometimes becomes locked by the stalk of a weed or otherwise.

When the lower ends of the retaining-slats are placed far enough from the surface of the main carrier to permit the passage of the full volume of hay, the compression exerted is not sufficient to compel the hay to keep the motion of the main carrier, and when a head-wind blowing through the main or elevated carrier lifts the weight of the hay off its surface that carrier has no control over the hay, which, accumulating, soon feels the pressure from the returning slats of the auxiliary carrier and goes astray; nor can this difficulty be overcome by lowering the retaining-slats rigidly, for then they would simply act as scrapers, the hay would be stopped and accumulated, and the same adverse action would take place. As a remedy for this difficulty I provide yielding compressors (more clearly illustrated in Figs. 1 and 16) consisting of flat springs $m$, rigidly secured at their forward ends to the retaining-slats, about the center of length thereof, and extending obliquely to the slats toward the rear to a point just forward of the upper end of the auxiliary carrier, where the springs are bent or curved upwardly so that their ends rest upon or above the cross-bar $n$, to which the lower ends of the retaining-slats are secured. These springs lie close to the upper surface of the main or elevating carrier, so that the smallest quantity of hay will be held thereby down upon and so as to be acted on by the carrier, while larger volumes of hay will easily lift the compressors and pass under them, but also be held by them firmly upon the carrier, which does not release the hay until it is safely beyond the point of danger, and even though it may accumulate above the compressors its only avenue of escape is with and over the carrier.

Another important feature of my invention is the means for automatically operating the lead dumping-rake $o$, (more clearly shown in Fig. 2,) which precedes the delivery-rake, gathering the hay into bunches and depositing it at regular intervals in front of the delivery-rake. These means preferably consist of a flanged wheel $p$, keyed upon the end of the pivot or journal $q$ of the dumping-rake, over which works and slides a sprocket-chain $r$, driven by a sprocket-wheel $s$ upon the hub of one of the ground-wheels, which chain is provided at intervals with transverse pins, preferably carrying anti-friction rollers $t$ on each end thereof, for engaging a pair of jaws or projections $u$, radiating from the periphery of the wheel $p$.

In operation the rake remains down in its normal position and the wheel stationary until the rollers upon the chain engage the jaws, when the wheel will be partially rotated, thereby causing the elevation and dumping of the rake, which will return to its normal position by gravity as soon as the jaws upon the wheel are released by the rollers. My invention, however, contemplates the separation of the jaws or equivalent actuating device from the wheel, whereby the wheel may be made as a loose or idle wheel journaled upon the pivot of the rake for carrying the chain, while the jaws may be mounted upon or form part of an arm or arms rigidly keyed to the pivot or journal of the rake upon one or both sides of the idle-pulley.

Instead of limiting the vibrations of the rake-teeth of the auxiliary gathering-carrier by the end walls of a slot in the radial arm-supports, pins, studs, or other form of stops may be employed, and so also it would be no departure from my invention to have the shaft O revolve independently of the teeth-supports, for so long as said shaft is an idler to either the slat-carrying wheels on said shaft or the rake the operation will be the same in its results.

Having described my invention, what I claim, and desire to secure by Letters Patent, is—

1. In a hay-loader, the combination, with the elevating-carrier, the auxiliary carrier, and the ground-wheel, of a master gear-wheel provided with internal and rim cogs and mounted concentrically to the ground-wheel, a pawl-and-ratchet connection between said ground and master gear-wheel, a gear-connection between the internal cogs and the drive-shaft of the elevating-carrier, and a pinion and sprocket-wheel and chain connection between the rim cogs and the power-shaft of the auxiliary carrier, substantially as described.

2. In a hay-loader, the combination, with the main or elevating carrier, the auxiliary carrier, and the ground-wheel, of a master gear-wheel provided with internal and rim cogs and mounted concentrically to the ground-wheel, a pawl-and-ratchet connection between said ground and master gear-wheel, a gear-connection between the internal cogs and the drive-shaft of the elevating-carrier, an adjustable arm mounted concentrically to the master gear-wheel, carrying a stud, a pinion and sprocket-wheel connected and mounted upon said stud, the former meshing with the rim-cogs and the latter having a sprocket-wheel and chain connection with the power-shaft of the auxiliary carrier, substantially as described.

3. In a hay-loader, the combination, with an auxiliary carrier and the upper drive-shaft thereof, of the side hanging arms journaled upon an axis common to said drive-shaft, the lower idle-shaft of said carrier journaled upon said arms, and spring-rods connecting the upper ends of said arms with the frame of the machine, whereby the lower end of said carrier is free to rise over obstructions upon the ground, substantially as described.

4. In a hay-loader, the combination, with an auxiliary carrier and the upper drive-shaft thereof, of the side hanging arms journaled upon an axis common to said drive-shaft, the lower idle-shaft of said carrier journaled upon said arms, and spring-rods connected at one end with the frame of the machine and at their opposite ends adjustably connected with the upper ends of said arms, substantially as described.

5. In a hay-loader, the combination, with an auxiliary carrier and the upper drive-shaft thereof, of the side hanging arms journaled upon an axis common to said drive-shaft, the lower idle-shaft of said carrier, a ball-and-socket connection between said shaft and arms, and spring-rods connecting the upper ends of said arms with the frame of the machine, whereby either end of the shaft may rise over obstructions independent of the other, substantially as described.

6. In a hay-loader, the combination, with a rotatable idle-shaft and a longitudinal series of radially-projecting rake-teeth secured to said shaft, of an endless slatted carrier operating around said shaft upon wheels loosely journaled thereon, the slats of said carrier operating to drive and strip the teeth, substantially as described.

7. In a hay-loader, the combination, with an idle-shaft and a longitudinal series of radially-projecting teeth pivotally secured to said shaft and free to have a partial circumferential movement about the shaft, of an endless slatted carrier operating around said shaft upon wheels loosely journaled thereon, the said slats operating to drive and strip the said teeth, substantially as described.

8. In a hay-loader, the combination, with an auxiliary carrier journaled at its upper end and yieldingly supported at its lower end and the lower idle-shaft of said carrier, of a series of radially-projecting longitudinally-arranged teeth secured upon said shaft, said slats operating to drive and strip said teeth, substantially as described.

9. In a hay-loader, the combination, with the main carrier, the auxiliary carrier, and the retaining slats, of compressing-springs rigidly secured at their upper ends to said slats and having their lower ends free to rise and fall, substantially as described.

10. In a hay-loader having a dumping-rake pivotally connected to its main frame, the combination, with a wheel mounted upon the journal of said rake and radial projections thereon, of the ground-wheel, a chain or belt connection between said ground-wheel and the wheel upon the journal of the rake, and projections on said chain or belt engaging and tripping the projections on said journal, substantially as described.

11. In a hay-loader having a dumping-rake pivotally connected to its main frame, the combination, with a flanged belt-wheel rigidly mounted upon the journal of said rake and provided with radial jaws, of a belt connecting one of the ground-wheels with and sliding upon said belt-wheel and trip-rollers or their equivalent upon said belt engaging and tripping said jaws, substantially as described.

MARSHALL BECK.

Witnesses:
R. C. OMOHUNDRO,
JNO. G. ELLIOTT.